(12) United States Patent
Amend

(10) Patent No.: US 11,997,020 B2
(45) Date of Patent: May 28, 2024

(54) MULTIPATH-CAPABLE COMMUNICATION DEVICE

(71) Applicant: Deutsche Telekom AG, Bonn (DE)

(72) Inventor: Markus Amend, Nidda (DE)

(73) Assignee: DEUTSCHE TELEKOM AG, Bonn (DE)

(*) Notice: Subject to any disclaimer, the term of this patent is extended or adjusted under 35 U.S.C. 154(b) by 4 days.

(21) Appl. No.: 17/471,192

(22) Filed: Sep. 10, 2021

(65) Prior Publication Data
US 2022/0086094 A1 Mar. 17, 2022

(30) Foreign Application Priority Data
Sep. 11, 2020 (EP) ..................................... 20195728

(51) Int. Cl.
*H04L 45/24* (2022.01)
*H04L 45/12* (2022.01)
*H04L 47/22* (2022.01)

(52) U.S. Cl.
CPC ............ *H04L 47/22* (2013.01); *H04L 45/123* (2013.01); *H04L 45/24* (2013.01)

(58) Field of Classification Search
CPC ........ H04L 45/24; H04L 45/123; H04L 47/22
See application file for complete search history.

(56) References Cited

U.S. PATENT DOCUMENTS

| 2004/0196788 A1* | 10/2004 | Lodha | ...................... H04L 47/50 370/468 |
| 2008/0198866 A1* | 8/2008 | Shahar | .................. H04L 47/245 370/412 |
| 2011/0134752 A1* | 6/2011 | Prestor | ..................... H04L 47/22 370/230.1 |

(Continued)

FOREIGN PATENT DOCUMENTS

| EP | 3534574 A1 | 9/2019 |
| WO | WO 2014044333 A1 | 3/2014 |
| WO | WO 2015199340 A1 | 12/2015 |

OTHER PUBLICATIONS

Broadband, "TR-348: Hybrid Access Broadband Network Architecture", Broadband Forum Technical Report, Jul. 2016, pp. 1-49, issue 1, Broadband Forum, Freemont, California, USA.

*Primary Examiner* — Benjamin Lamont
(74) *Attorney, Agent, or Firm* — LEYDIG, VOIT & MAYER,LTD.

(57) ABSTRACT

A multipath capable communication device includes: a first communication path and a second communication path configured to provide data traffic to be transmitted; at least one control unit; a multipath scheduler configured to distribute data traffic to the first communication path and/or to the second communication path based on a first path metric; a first traffic shaper configured to limit the total bandwidth allocated to the communication device to a first adjustable bandwidth limiting value; and a second traffic shaper configured to limit the bandwidth allocated to the first commu- (Continued)

50 personal computer
51 communication interface
60 external traffic policy system
61 communication interface
110 residential router
111 LTE-based access interface
112 xDSL-based access interface
113 communication interface
114 communication interface
120 multi-access traffic handler
121 second traffic shaper
122 third traffic shaper
123 communication path de-multiplexer
124 first traffic shaper
125 an access multiplexer
126 multipath scheduler
130 control unit
140 memory
170 first communication path
171 second communication path nication path to a second adjustable bandwidth limiting value and/or a third traffic shaper configured to limit the bandwidth allocated to the second communication path to a third adjustable bandwidth limiting value. The at least one control unit is configured to control the multipath scheduler, the first traffic shaper, and the second traffic shaper and/or third traffic shaper.

12 Claims, 4 Drawing Sheets

(56) References Cited

U.S. PATENT DOCUMENTS

| | | | |
|---|---|---|---|
| 2015/0237525 A1* | 8/2015 | Mildh | H04L 45/24 370/230.1 |
| 2016/0021027 A1* | 1/2016 | Ong | H04L 47/828 370/230 |
| 2017/0134261 A1* | 5/2017 | Seo | H04L 45/24 |
| 2018/0041440 A1* | 2/2018 | Goemaere | H04W 88/16 |
| 2018/0254979 A1 | 9/2018 | Scahill et al. | |
| 2018/0255560 A1 | 9/2018 | Han et al. | |
| 2019/0387451 A1 | 12/2019 | Kucera et al. | |

* cited by examiner

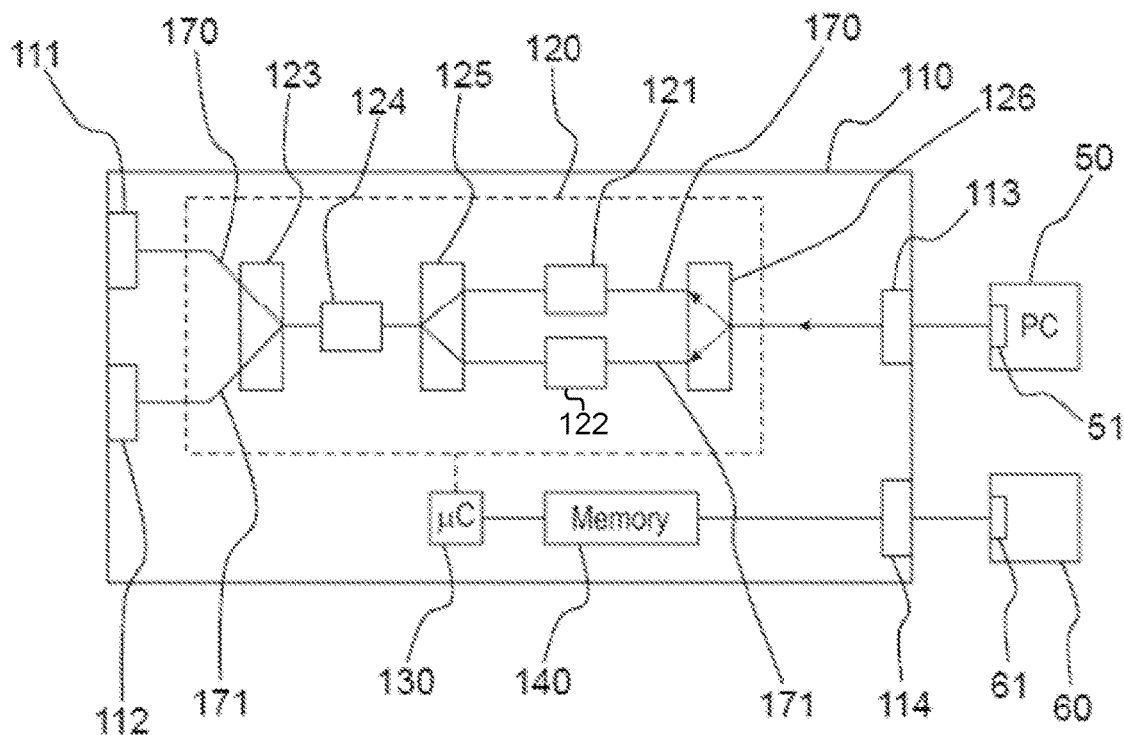

Fig. 2

50 personal computer
51 communication interface
60 external traffic policy system
61 communication interface
110 residential router
111 LTE-based access interface
112 xDSL-based access interface
113 communication interface
114 communication interface
120 multi-access traffic handler
121 second traffic shaper
122 third traffic shaper
123 communication path de-multiplexer
124 first traffic shaper
125 an access multiplexer
126 multipath scheduler
130 control unit
140 memory
170 first communication path
171 second communication path

MULTIPATH-CAPABLE COMMUNICATION DEVICE

CROSS-REFERENCE TO PRIOR APPLICATIONS

This application claims benefit to European Patent Application No. EP 20 195 728.9, filed on Sep. 11, 2020, which is hereby incorporated by reference herein.

TECHNICAL FIELD

The present invention relates to a multipath-capable communication device, which may be configured to perform traffic shaping and steering on data traffic to be transmitted for example via multiple access networks.

BACKGROUND

In particular, due to the increasing pervasiveness of the Internet, there is a demand for higher data throughput and reliability of IP-based telecommunications systems. As a result, different approaches have been pursued, such as the development of multipath transport protocols, e.g. the Multipath Transmission Control Protocol (MPTCP) or Quick UDP Internet connections (QUIC), the Access Traffic Steering, Switching and Splitting (ATSSS) technology, and multiple access networks like hybrid access networks. The Third Generation Partnership Project (3GPP) is one of the organizations that develops standards on these fields. A hybrid access network combines different access network technologies, for example fixed line access network technologies such as xDSL, with wireless access network technologies such as Universal Mobile Telecommunications System (UMTS), Long Term Evolution (LTE) or 5G which allow residential premises equipment having multiple access interfaces to communicate effectively with the Internet. An explanation of the hybrid access architecture can be found at www.broadband-forum.org (TR-348).

An issue regarding multiple-access networks is to perform traffic shaping to optimize quality of service, improve latency, and increase usable bandwidth for data traffic of different traffic classes. Traffic shaping requires, for example, control of the volume of data traffic being sent over a hybrid access network or of the data rate and data throughput, respectively, at which the traffic is sent.

A method of traffic shaping and steering for a multipath transmission protocol connection is described in WO 2014/044333 A1.

SUMMARY

In an exemplary embodiment, the present invention provides a multipath capable communication device. The multipath capable communication device includes: a first communication path and a second communication path configured to provide data traffic to be transmitted; at least one control unit; a multipath scheduler configured to distribute data traffic to the first communication path and/or to the second communication path based on a first path metric; and a first traffic shaper configured to limit the total bandwidth allocated to the communication device to a first adjustable bandwidth limiting value. The multipath capable communication device further includes: a second traffic shaper configured to limit the bandwidth allocated to the first communication path to a second adjustable bandwidth limiting value; and/or a third traffic shaper configured to limit the bandwidth allocated to the second communication path to a third adjustable bandwidth limiting value. The at least one control unit is configured to control the multipath scheduler, the first traffic shaper, and the second traffic shaper and/or third traffic shaper.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows a block diagram of a further exemplary communication device configured to perform a multi-stage traffic shaping;

DETAILED DESCRIPTION

Exemplary embodiments of the present invention provide a multipath-capable communication device, which allows for flexible traffic shaping of data traffic being sent over multiple communication paths and multiple access networks, respectively. According to a further aspect, the total bandwidth allocated to the multipath-capable communication device, as well as the individual bandwidths allocated to different communication paths and different access interfaces, respectively, may be adjusted or readjusted to optimize data throughput.

Figure 1:
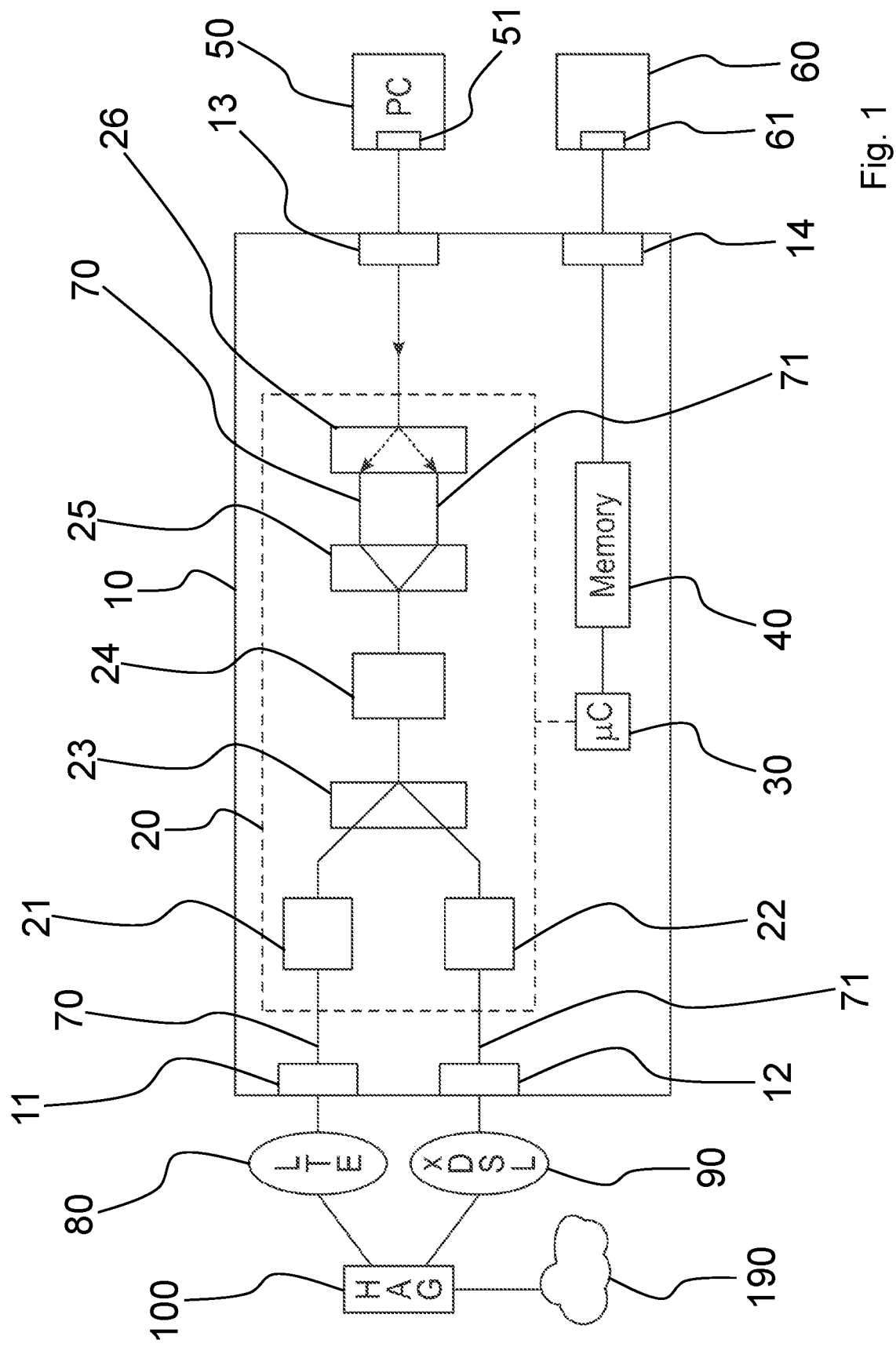
FIG. 1 shows a block diagram of an exemplary communication device configured to perform a multi-stage traffic shaping.

Referring now to FIG. 1, an exemplary communication system 1 is depicted which may comprise a multipath capable communication device 10, which may be implemented as a residential device, in particular as a residential router. Furthermore, the illustrative communication system 1 may further comprise a multiple access network, for example a hybrid access network which in turn may comprise two different access networks 80 and 90, which may be connected to a network device 100 which may operate as an hybrid access gateway. Access network 80 may be implemented as a wireless access network, e.g. an LTE-based access network, wherein access network 90 may be a fixed line access network, e.g. an xDSL access network. As a result, residential router 10 may comprise a multiple access interface including for example a wireless access interface 11, e.g. an LTE-based access interface, connectable to the access network 80 and a fixed line access interface 12, e.g. an xDSL access interface, connectable to the fixed access network 80. The access interfaces 11 and 12 may be implemented as physical and/or software components. It should be noted that the residential router 10 may comprise more than two access interfaces.

Preferably, residential router 10 may further comprise a communication interface 13 configured to connect to a user end device 50, e.g. a personal computer. The communication interface 13 may be implemented as an Ethernet-based or Wi-Fi-based hardware interface. The personal computer 50 may include a communication interface 51, which is connectable to the communication interface 13. Therefore, communication interface 51 may be implemented as an Ethernet-based or Wi-Fi-based hardware interface. Furthermore, the residential router 10 may include a further communication interface 14, which may be configured to receive for example data traffic policy rules and/or traffic shaping parameters, which may be provided by an external traffic policy system 60 or any other device configured to communicate via a communication interface 61 and the communication interface 14 with the residential router 10. It is to be noted that the traffic policy system 60 can be implemented in the network device 100, or belong to an Internet service provider or communicate via the access network 80 and/or the access network 90. It has to be further noted that for example with the network device 100 using a multipath transport protocol, e.g. MPTCP or QUIC, the data traffic policy rules and/or traffic shaping parameters can be transmitted in data packets to the residential router 10 using the multipath transport protocol. It should be noted that the communication interface 14 can be configured to communicate via the access network 80 and/or the access network 90. It should be further noted that the communication interface 14 may support a data communication according to the multipath transport protocol used by the residential router 10 and thus may communicate with the network device 100. It should be still further noted that the communication interface 14 may receive the data traffic policy rules and/or traffic shaping parameters from the applied multipath transport protocol used between the residential router 10 and the network device 100. The multipath transport protocol used by the residential router 10 and/or data traffic policy rules and/or traffic shaping parameters may be stored in a memory 40 of the residential router 10. The multipath transport protocol and/or data traffic policy rules and/or traffic shaping parameters may be implemented as a Multipath protocol Policy Manager (MPPM) as described in the European patent application no. EP 3 534 574 A1 which is incorporated herein by reference.

In an embodiment, the illustrative residential router 10 may further comprise
- a control unit 30, which may be implemented as a micro controller,
- a multipath scheduler 26,
- a first traffic shaper 24 preferably configured to limit the total band with allocated to the residential router 10 to a first adjustable bandwidth limiting value,
- a second traffic shaper 21 preferably configured to limit the bandwidth allocated to a first communication pass 70, to a second adjustable bandwidth limiting value, and/or
- a third traffic shaper 22 preferably configured to limit the bandwidth allocated to a second communication path 71 to a third adjustable bandwidth limiting value,
- a communication path multiplexer 25, also referred to as an access multiplexer, and
- a communication path de-multiplexer 23, also referred to as an access de-multiplexer.

It should be noted that the multipath scheduler 26, the first traffic shaper 24, the second traffic shaper 21, the third traffic shaper 23, the communication path multiplexer 25 and the communication path de-multiplexer 23 may constitute a multi-access traffic handler 20, which may be implemented by hardware components and/or by software modules which are controllable and/or executable by the control unit 30.

The first, second and third adjustable bandwidth limiting values may correspond to the traffic shaping parameters storable on the memory 40. For example, the traffic policy rules may include a first path metric defining, for example in dependence of the traffic class, how data traffic shall be transmitted over the first communication path 70 and/or the second communication path 71. It should be noted that residential router 10 may comprise more than two communication paths.

In addition, a plurality of instructions and/or computer programs may be stored in the memory 40, which may be executed by the control unit 30 to control in connection with the multipath transport protocol and/or the data traffic policy rules and/or the traffic shaping parameters, for example, the multipath scheduler 26, the first traffic shaper 24, the second traffic shaper 21 and the third traffic shaper 22.

In the exemplary residential router 10, data traffic received at communication interface 13 is forwarded to the multipath scheduler 26, which is configured to decide according to the first path metric whether the data traffic is to be delivered to the first communication path 70 and/or to the second communication path 71. Both communication paths 70 and 71 are connected to the access multiplexer 25, which is preferably configured to multiplex the data traffic transmitted over the first communication path 70 and the second communication path 71 and to deliver the multiplexed data traffic to the first traffic shaper 24. The data traffic processed by the first traffic shaper 24 is delivered to the access de-multiplexer 23, which may forward portions of the data traffic to the second traffic shaper 21 and portions of the data traffic to the third traffic shaper 22. The portions of the data traffic processed by the second traffic shaper 21 are forwarded over the first communication path 70 to the LTE-based access interface 11, wherein the portions of the data traffic processed by the third traffic shaper 22 are forwarded over the second communication path 71 to the xDSL-based access interface 12.

Now, the operation of the residential router 10 is described in detail.

It is assumed that the maximum data rate for the residential router 10 is to be set to 20 Mbps according to a tariff contract between the user of the residential router 10 and an Internet Service Provider, which for example may operate the network device 100. Therefore, the first traffic shaper 24 is configured to limit the total bandwidth, allocated to the residential router 10 to an adjustable bandwidth limiting value, which is the maximum data rate of 20 Mbps. Next, it is assumed that in average xDSL connections may provide a data rate of 10 Mbps. In order to reduce the risk of cost intensive data transmission over the LTE-based access network 80 to a half of the maximum data rate, the data rate associated with the LTE-based access interface shall be set for example to 10 Mbps, wherein the data rate associated with the xDSL-based access interface 12 may be set for example to the maximum data rate, i.e. 20 Mbps. Therefore, the adjustable bandwidth limiting value of the second traffic shaper 21 is adjusted to 10 Mbps, the adjustable bandwidth limiting value of the third traffic shaper 22 is adjusted to 20 Mbps and the bandwidth limiting value of the first traffic shaper 24 is adjusted to 20 Mbps. Preferably, the third traffic shaper 22 is deactivated.

Now, it is further assumed that the personal computer 50 has data traffic to be transmitted, for example via the network device 100, to the Internet 190. It is further assumed that a path metric, i.e. path policy rules, is stored in the memory 40 defining that data traffic to be sent to the Internet 190 are preferably transmitted via the xDSL access network 90 but also via LTE access network 80. Now the data traffic, which comprises preferably a plurality of IP data packets, is forwarded to the multipath scheduler 26 which distributes the entire data traffic only to the second communication path 71, if the maximum data rate is available with respect to the xDSL access network 90. Otherwise portions of the data traffic are distributed to the first communication path 70 and to the second communication path 71, wherein the traffic shaper 21 limits the portion of the data traffic to be transmitted via the first communication path 70 to the adjusted data rate of 10 Mbps associated to the first communication path 70. The data traffic and the portions of data traffic are processed by the multi-access traffic handler as illustrated above. Finally, the data traffic received from the personal computer 50 is then transmitted via the wireless access interface 11 and/or the xDSL access interface 12 via the network device 100 to the Internet 190.

It should be noted that communication device 10 as shown in FIG. 1 may be alternatively implemented as a user end device such as a mobile phone. In this case, the access interface 12 would be implemented for example as a Wi-Fi access interface.

Referring now to FIG. 2, an exemplary communication system 2 is depicted which may comprise an exemplary residential router 110.

Furthermore, the illustrative communication system 2 may further comprise similar to communication system 1 the multiple access network, for example a hybrid access network which in turn may comprise two different access networks 80 and 90, which may be connected to the network device 100 which may operate as an hybrid access gateway as shown in FIG. 1.

The residential router 110 may comprise a multiple access interface including for example a wireless access interface 111, e.g. an LTE-based access interface, connectable to the access network 80 and a fixed line access interface 112, e.g. an xDSL access interface, connectable to the fixed access network 80. The access interfaces 111 and 112 may be implemented as physical and/or software components. It should be noted that the residential router 10 may comprise more than two access interfaces.

Preferably, residential router 110 may further comprise a communication interface 113 configured to connect to a user end device 50, e.g. a personal computer. The communication interface 113 may be implemented as an Ethernet-based or Wi-Fi-based hardware interface. The personal computer 50 may include a communication interface 51, which is connectable to the communication interface 113. Therefore, communication interface 51 may be implemented as an Ethernet-based or Wi-Fi-based hardware interface. Furthermore, the residential router 110 may include a further communication interface 114, which may be configured to receive for example data traffic policy rules and/or traffic shaping parameters, which may be provided by the external traffic policy system 60 or any other device configured to communicate via the communication interface 61 and the communication interface 114 with the residential router 110. It is to be noted that the traffic policy system 60 can be implemented in the network device 100 or belong to an Internet service provider or communicate via the access network 80 and/or the access network 90. It has to be further noted that, for example with the network device 100 using a multipath transport protocol, e.g. MPTCP or QUIC, the data traffic policy rules and/or traffic shaping parameters can be transmitted in data packets to the residential router 110 using the multipath transport protocol. It should be noted that the communication interface 114 can be configured to communicate via the access network 80 and/or the access network 90. It should be further noted that the communication interface 114 may support a data communication according to the multipath transport protocol used by the residential router 110 and thus may communicate with the network device 100. It should be still further noted that the communication interface 114 may receive the data traffic policy rules and/or traffic shaping parameters from the applied multipath transport protocol used between the residential router 110 and the network device 100. The multipath transport protocol and/or data traffic policy rules and/or traffic shaping parameters may be stored in a memory 140 of the residential router 110. The multipath transport protocol and/or data traffic policy rules and/or traffic shaping parameters may be implemented as a Multipath protocol Policy Manager (MPPM) as described in the European patent application no. EP 3 534 574 A1 which is incorporated herein by reference.

In an embodiment, the illustrative residential router 110 may further comprise
- a control unit 130, which may be implemented as a micro controller,
- a multipath scheduler 126,
- a first traffic shaper 124 preferably configured to limit the total bandwidth allocated to the residential router 110 to a first adjustable bandwidth limiting value,
- a second traffic shaper 121 preferably configured to limit the bandwidth allocated to a first communication pass 170, to a second adjustable bandwidth limiting value, and/or
- a third traffic shaper 122 preferably configured to limit the bandwidth allocated to a second communication path 171 to a third adjustable bandwidth limiting value,
- a communication path multiplexer 125, also referred to as an access multiplexer, and
- a communication path de-multiplexer 123, also referred to as an access de-multiplexer.

It should be noted that the multipath scheduler 126, the first traffic shaper 124, the second traffic shaper 121, the third traffic shaper 123, the communication path multiplexer 125 and the communication path de-multiplexer 123 may constitute a multi-access traffic handler 120, which may be implemented by hardware components and/or by software modules which are controllable and executable by the control unit 130.

The first, second and third adjustable bandwidth limiting values may correspond to the traffic shaping parameters storable on the memory 140. For example, the traffic policy rules may include a first path metric defining for example in dependence of the traffic class how data traffic shall be transmitted over the first communication path 170 and/or the second communication path 171. It should be noted that residential router 110 may comprise more than two communication paths.

In addition, a plurality of instructions and/or computer programs may be stored in the memory 140, which may be executed by the control unit 130 to control in connection with the multipath transport protocol and/or the data traffic policy rules and/or the traffic shaping parameters, for example, the multipath scheduler 126, the first traffic shaper 124, the second traffic shaper 121 and the third traffic shaper 122.

In the exemplary residential router 110, data traffic received at communication interface 113 is forwarded to the multipath scheduler 126, which is configured to decide according to the first path metric whether the data traffic is to be delivered to the first communication path 170 and/or to the second communication path 171. The second traffic shaper 121 is associated with and connected to, respectively, the first communication 170, wherein the third traffic shaper 122 is associated with and connected to, respectively, the second communication 171. The data traffic processed by the second traffic shaper 121 and the data traffic processed by the third traffic shaper 122 are delivered to the access multiplexer 126. The multiplexed data traffic is then forwarded to the first traffic shaper 124. The data traffic processed by the traffic shaper 124 is forwarded to the access de-multiplexer 123 which in turn forwards the respective data traffic via the first communication path 170 to the LTE-based access interface 111 and the respective data traffic via the second communication path 171 to the xDSL-based access interface 112.

It is to be noted that residential router 110 may be operated in a similar manner as residential router 10. Therefore, the operation described above in connection with residential router 10 also applies to residential router 110.

Figure 3:
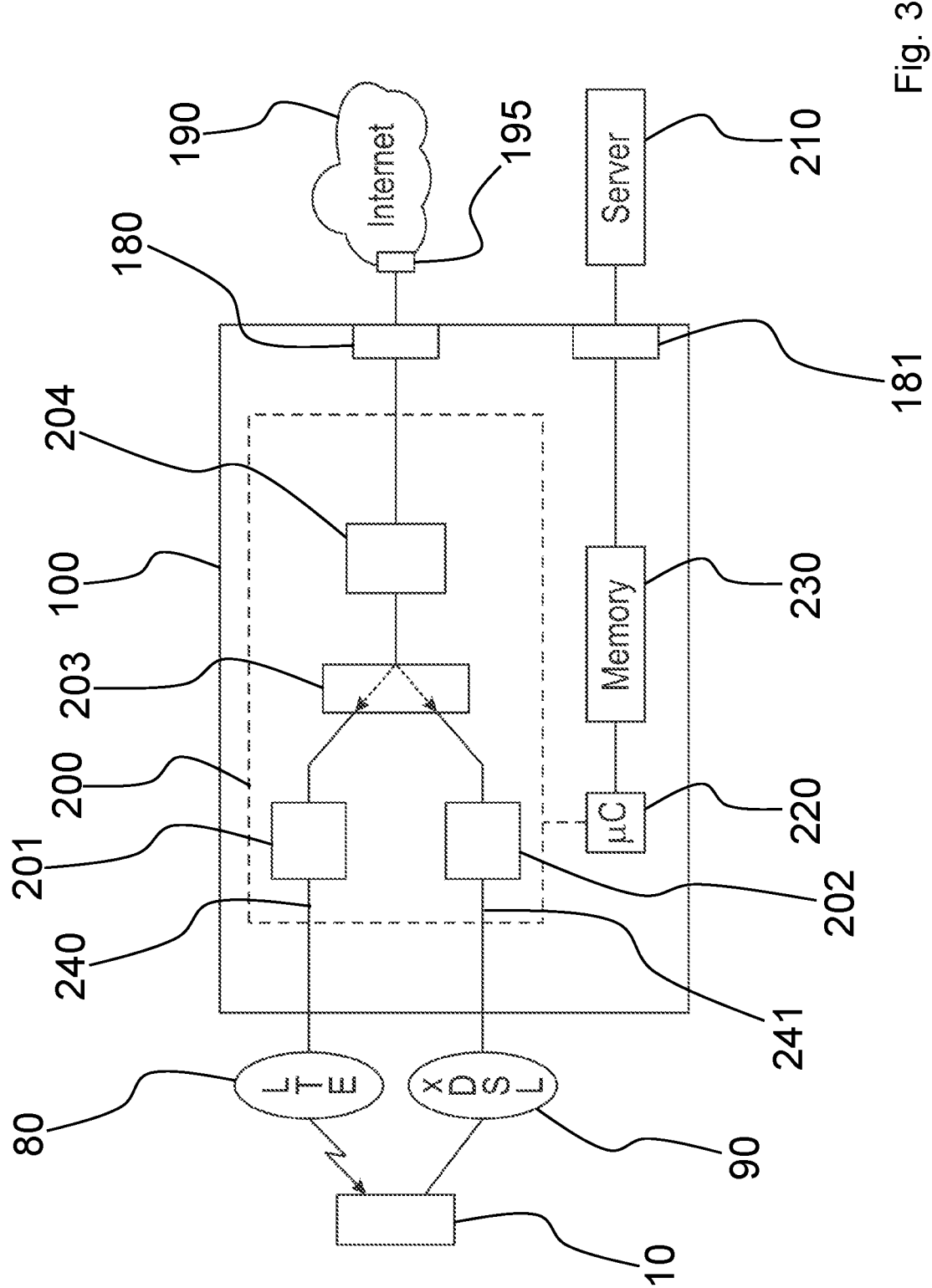
FIG. 3 shows a block diagram of a further exemplary communication device configured to perform a multi-stage traffic shaping.

Referring now FIG. 3, a third exemplary communication system 3 is shown which may comprise a multipath capable communication device 100. The exemplary communication device 100 may be implemented as a network device which may be implemented as a hybrid access gateway. The network device 100 may include a communication interface 180 connectable to the Internet 190 and preferably to a server 195 which may belong to the Internet 190. The network device 100 may communicate in a known manner via the access networks 80 and 90 with the residential router 10. The access networks 80 and 90 have been described in detail with respect to FIG. 1.

Preferably, network device 100 may comprise a further communication interface 181, which may be configured to receive for example data traffic policy rules and/or traffic shaping parameters, which may be provided by an external traffic policy system 210 or any other device configured to communicate via the communication interface 181 with the network device 100. It is to be noted that the traffic policy system 210 can be implemented in the network device 100 itself, or belong to an Internet service provider or communicate via the access network 80 and/or the access network 90. It has to be further noted that for example with the network device 100 using a multipath transport protocol, e.g. MPTCP or QUIC, the data traffic policy rules and/or traffic shaping parameters can be transmitted in data packets to the network device 100 using the multipath transport protocol. It should be noted that the communication interface 181 can be configured to communicate via the access network 80 and/or the access network 90. It should be further noted that the communication interface 181 may support a data communication according to the multipath transport protocol used by network device 100. It should be still further noted that the communication interface 181 may receive the data traffic policy rules and/or traffic shaping parameters from the applied multipath transport protocol. The multipath transport protocol used by the residential router 10 and/or data traffic policy rules and/or traffic shaping parameters may be stored in a memory 230 of the network device 100. The multipath transport protocol and/or data traffic policy rules and/or traffic shaping parameters may be implemented as a Multipath protocol Policy Manager (MPPM) as described in the European patent application no. EP 3 534 574 A1 which is incorporated herein by reference.

In an embodiment, the illustrative network device 100 may further comprise a control unit 220, which may be implemented as a micro controller,
a multipath scheduler 203,
a first traffic shaper 204 preferably configured to limit the total band with allocated to the residential router 10 to a first adjustable bandwidth limiting value,
a second traffic shaper 201 preferably configured to limit the bandwidth allocated to a first communication path 240, to a second adjustable bandwidth limiting value, and/or
a third traffic shaper 202 preferably configured to limit the bandwidth allocated to a second communication path 241 to a third adjustable bandwidth limiting value.

It should be noted that the multipath scheduler 203, the first traffic shaper 204, the second traffic shaper 201, the third traffic shaper 202 may constitute a multi-access traffic handler 200, which may be implemented by hardware components and/or by software modules which are controllable and executable by the control unit 220.

The first, second and third adjustable bandwidth limiting values may correspond to the traffic shaping parameters storable on the memory 230. For example, the traffic policy rules may include a first path metric defining for example in dependence of the traffic class how data traffic shall be transmitted over the first communication path 240 and/or the second communication path 241. It should be noted that the network device 100 may comprise more than two communication paths.

In addition, a plurality of instructions and/or computer programs may be stored in the memory 230, which may be executed by the control unit 220 to control in connection with the multipath transport protocol and/or the data traffic policy rules and/or the traffic shaping parameters, for example, the multipath scheduler 203, the first traffic shaper 204, the second traffic shaper 201 and the third traffic shaper 202.

It should be noted that the multi-communication path traffic handler 200 may be implemented similar or identical to the multi-communication path traffic handler 20 or 120.

Returning to FIG. 3 data traffic, which is intended to be transmitted from the Internet server 195 for example to residential router 10 and the personal computer 50 is received at the communication interface 180. The data traffic may comprise a plurality of data packets, for example IP data packets each including the destination address of the residential router 10. Next the data traffic is processed under control of the control unit 220 in that the data traffic is delivered to traffic shaper 204, then forwarded to the multipath scheduler 203 which decides in response to the path metric stored on memory 230 which portion of the data packets should be forwarded to the first communication path 240 and which data packets should be forwarded to the second communication path 241. The data packets transmitted via the communication path 240 are processed by the traffic shaper 201 which is configured to limit the bandwidth allocated to the first communication path 240 to a first bandwidth limiting value. The data packets that are transmitted via the communication path 241 are processed by the traffic shaper 202 which is configured to limit the bandwidth allocated to the second communication path 241 to a second bandwidth limiting value. Finally, and in dependence of the decision of the multipath scheduler 203, some data packets are transmitted via communication path 240 over the LTE access network 80, and some data packets are transmitted via the communication path 241 over the xDSL access network 90 to the residential router 10 which may be configured to put together the received data packets to the original data traffic and forward the data traffic via its communication interface 13 to personal computer 50. In an exemplary scenario, it is assumed that a tariff-based bandwidth of 16 Mbps is available for the residential router 10 with respect to the xDSL-access network 90. Therefore, in order to prevent the network device 100 from pushing a data volume via the xDSL access network 90 to the residential router, which exceeds the tariff-based bandwidth, the traffic shaper 202 can be adjusted to limit its bandwidth to a bandwidth limiting value of 16 Mbps.

Figure 4:
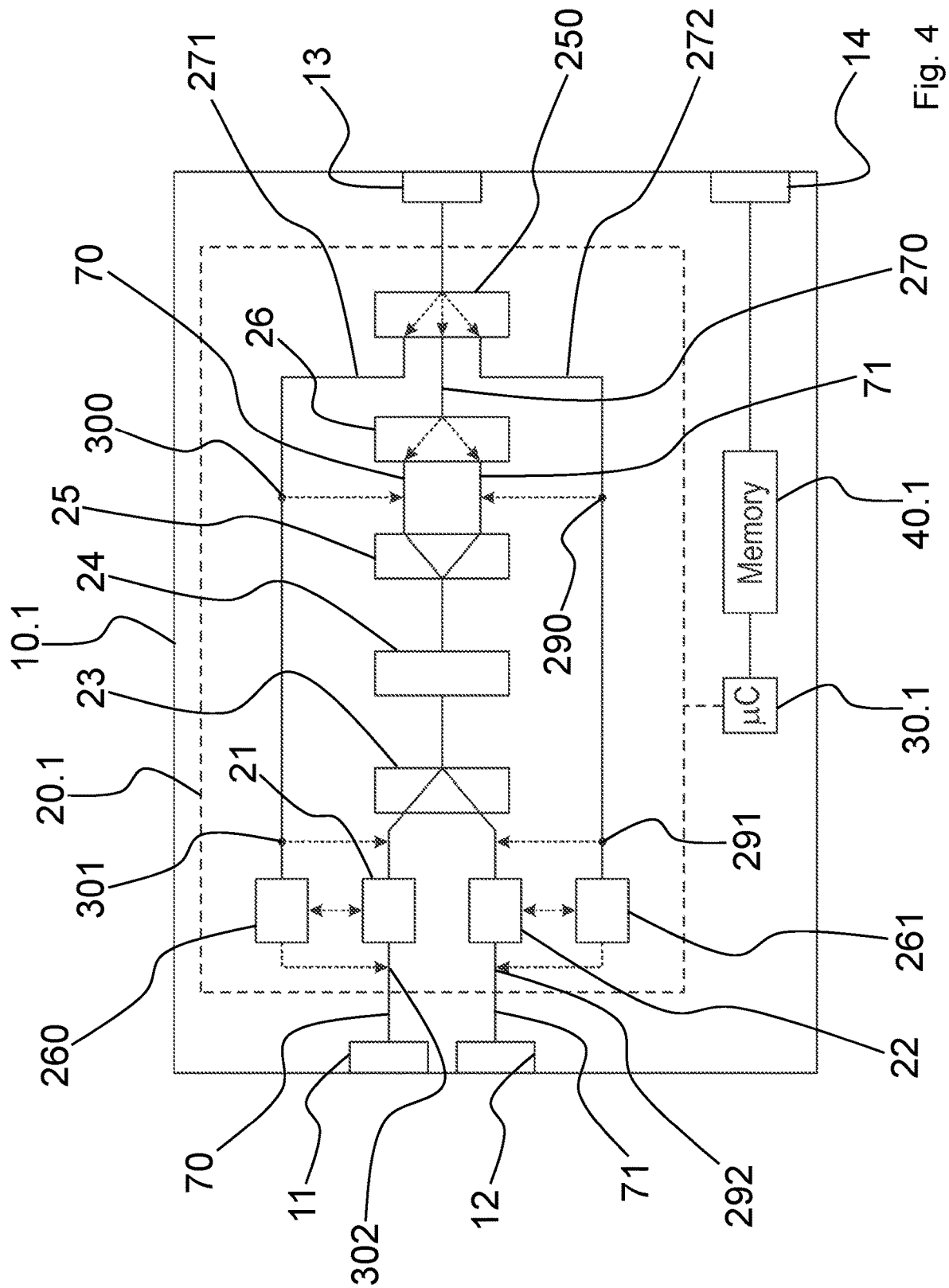
FIG. 4 shows a block diagram of a still further exemplary communication device configured to perform a multi-stage traffic shaping in connection with a bypass switching device.

It should be noted that the multi-access traffic handler 200 may be replaced by the multi-access traffic handler 20, 120 or 20.1 as shown in the FIGS. 1, 2 and 4.

Referring now to FIG. 4, an exemplary communication device 10.1 is illustrated which is an exemplary modification of the exemplary residential router 10 as shown in FIG. 1. Therefore, reference numbers used in FIG. 4, which are identical to reference numbers used in FIG. 1 indicate identical or similar software and/or hardware components. In addition, the control unit 30.1 and memory 40.1 may be implemented in a similar manner as the control unit 30 and the memory 40 of the residential router 10 as depicted in FIG. 1. It is to be noted that the above illustration of residential router 10 is also applicable to the communication device 10.1.

The exemplary residential router 10.1 further comprises a switching device 250, which is arranged between the communication interface 13 and the multipath scheduler 26. Preferably, the switching device 250 is connected via a link 270 to the multipath scheduler 26 and to a first bypath communication path 271 and to a second bypass communication path 272. Bypass communication path 271 is associated with access interface 11, whereas bypass communication path 272 is associated with access interface 12. Preferably, the switching device 250 is configured to switch data traffic received at communication interface 13 in dependence of a second path metric to the first bypass communication path 271 or to the second bypass communication path 272 or to the multipath scheduler 26 via link 270.

The second path metric used by the switching device 250 may include rules defining, for example, that multipath capable data traffic is to be transmitted via link 270 to the multipath scheduler 26, wherein non-multipath capable data traffic is to be transmitted via the first bypass communication path 271 or the second bypass communication path 272. It is to be noted that data packets belonging to multipath capable data traffic and data packets belonging to non-multipath capable data traffic are labeled respectively. In addition, the path metric may include rules which allow the switching device 250 to recognize data traffic belonging to different traffic classes and to decide, in dependence of the traffic class the data traffic belongs to, to which of the communication paths 270, 271 or 272 the data traffic is to be switched. The decision as to whether data traffic is to be switched to bypass communication path 271 or bypass communication path 272 may be made on the basis of a cost metric defining, for example, that data traffic belonging to a TV service should be, if available, transmitted via the xDSL access interface 12 and thus switched to bypass communication path 272.

As shown in FIG. 4, there exist different possible connection points to connect or couple the bypass communication path 271 to the first communication path 70 and the bypass communication path 272 to the second communication path 71 in order to may combine or reassemble data traffic transmitted over the communication path 70 and data traffic transmitted over the bypass communication path 271 and/or to combine or reassemble data traffic transmitted over the communication path 71 and data traffic transmitted over the bypass communication path 272.

As shown in FIG. 4, bypass communication path 271 may be coupled to communication path 70 at a connection point 300, i.e. between the path scheduler 26 and the access multiplexer 25, or at a connection point 301, i.e. between the access de-multiplexer 23 and the traffic shaper 21, or at a connection point 302. In the latter case, a traffic shaper 260 may be connected into bypass communication path 271 so that data traffic transmitted over the bypass communication path 271 may be processed by the traffic shaper 260 before reaching the access interface 11. In a similar way, bypass communication path 272 may be coupled to communication path 71 at a connection point 290, i.e. between the path scheduler 26 and access multiplexer 25, or at a connection point 291, i.e. between the access de-multiplexer 23 and the traffic shaper 22, or at a connection point 292. In the latter case, a traffic shaper 261 may be connected into bypass communication path 272 so that data traffic transmitted over the bypass communication path 272 may be processed by the traffic shaper 261 before reaching the access interface 12. The traffic shaper 260 is preferably configured to limit the bandwidth allocated to the first bypass communication path 271 to a fourth adjustable bandwidth limiting value, wherein the traffic shaper 261 is preferably configured to limit the bandwidth allocated to the bypass communication path 272 to a fifth adjustable bandwidth limiting value.

It should be noted that data traffic which is transmitted over the bypass communication path 271 and coupled onto communication path 70 at connection point 300 is transmitted through access multiplexer 24 to traffic shaper 24, processed by traffic shaper 24, forwarded by access de-multiplexer 23 to traffic shaper 21 and processed by traffic shaper 21 and forwarded to the access network interface 11. In a similar way, data traffic which is transmitted over the bypass communication path 272 and coupled onto communication path 71 at connection point 290 is transmitted through access multiplexer 24 to traffic shaper 24, processed by traffic shaper 24, forwarded by access de-multiplexer 23 to traffic shaper 22 and processed by traffic shaper 22 and then forwarded to the access network interface 12. Data traffic transmitted via the bypass communication path 271 and coupled onto communication path 70 at connection point 301 is processed by the traffic shaper 21, whereas data traffic transmitted via the bypass communication path 272 and coupled onto communication path 71 at connection point 291 is processed by the traffic shaper 21.

It should be noted that the multipath scheduler 26, the first traffic shaper 24, the second traffic shaper 21, the third traffic shaper 23, the communication path multiplexer 25, the traffic shapers 260 and 261, the switching device 250 and the communication path de-multiplexer 23 may constitute a multi-access traffic handler 20.1, which may be implemented as hardware components and/or as software modules which are controllable and executable by the control unit 30.1.

The first, second, third, fourth and fifth adjustable bandwidth limiting values may correspond each to the traffic shaping parameters storable on the memory 40.1. For example, the traffic policy rules may include the first path metric defining, for example, in dependence of the traffic class, how data traffic shall be transmitted over the first communication path 70 and/or the second communication path 71 and the second path metric. It should be noted that the residential router 10.1 may comprise more than two communication paths.

In addition, a plurality of instructions and/or computer programs may be stored in the memory 40.1, which may be executed by the control unit 30.1 to control in connection with the multipath transport protocol and/or the data traffic policy rules and/or the traffic shaping parameters, for example, the multipath scheduler 26, the first traffic shaper 24, the second traffic shaper 21, the third traffic shaper 22, the traffic shaper 260 and 261 and the switching device 250.

The respective band with limiting values may be generated by the device 60 and delivered via communication interfaces 61 and 14 to the residential router 10.1, which is configured to store the bandwidth limiting values in memory 40.1. In a similar way, the external device 60 may be configured to generate and update the first and second path metrics associated with the switch device 250 and the multipath scheduler 26, respectively.

It should be noted that the path metrics associated with the switch device 250 and/or multipath scheduler 26 may include rules which decide in dependence of different traffic classes for the respective data traffic received at communication interface 13 are to be forwarded via communication path 270 or by path 271 or by path 272. For example, a path metric used by switching device 250 may rule that data traffic associated to the TV service is to be forwarded via second bypass 272 since the xDSL access interface 12 to be used is the cheapest access interface.

Now it is assumed that the bypass communication path 271 includes the traffic shaper 260, which is connected to the communication path 70 at the connection point 302, wherein the bypass communication path 272 includes the traffic shaper 261, which is connected to the communication path 71 at the connection point 292.

According to an embodiment, both the traffic shaper 260 and the traffic shaper 21, as well as both the traffic shaper 22 and the traffic shaper 261, can be logically coupled.

In a first exemplary scenario it is assumed that a bandwidth of 10 Mbps is available with respect to the xDSL access interface 12 allowing transmission of TV-based data traffic. In addition it is assumed that the bandwidth limiting value of the traffic shapers 22 and 261 are set to 10 Mbps each. For example, the control unit 30.1 may be configured to control the traffic shaper 261 and the traffic shaper 22 such that traffic shaper 261 is prioritized over traffic shaper 22 in order to allow TV-based data traffic transmitted over the bypass communication path 272 to be processed and forwarded to the xDSL access interface 12 first.

In a second exemplary scenario, it is assumed that a bandwidth of 16 Mbps is available with respect to the xDSL access interface 12 of the residential router 10.1 and that the initial bandwidth limiting values of the traffic shaper 22 and 261 are set to 10 Mbps each. In order to allow transmission of TV-based data traffic via the xDSL-based access interface 12, the control unit 30.1 may be configured to readjust, if the personal computer 50 is prepared to transmit TV-based data traffic, the bandwidth limiting value of the traffic shaper 22 to 6 Mbps while keeping the bandwidth limiting value of the traffic shaper 261 unchanged at 10 Mbps. Alternatively, the control unit 30.1 may be configured to keep the bandwidth limiting value with respect to the traffic shaper 22 and the traffic shaper 261 unchanged at 10 Mbps, but to increase the current bandwidth limiting value of the traffic shaper 24 by 6 Mbps.

At least some of the exemplary aspects illustrated above in connection with the FIGS. 1 to 4 are now summarized.

According to an embodiment, a multipath capable communication device 10, 110, 10.1, 100 may comprise:

at least a first communication path 70, 170, 240 and a second communication path 71, 171, 241, each configured to provide data traffic to be transmitted, at least one control unit 30, 130, 22, 30.1, a multipath scheduler 26, 126, 203 configured to distribute data traffic to the first communication path 70, 170, 240 and/or to the second communication path 71, 171, 241 in dependence of a first path metric, a first traffic shaper 24, 124, 204 configured to limit the total bandwidth allocated to the communication device 10, 110, 10.1, 100 to a first adjustable bandwidth limiting value, a second traffic shaper 21, 121, 201 configured to limit the bandwidth, allocated to the first communication path 70, 170 and 240, respectively, to a second adjustable bandwidth limiting value, and/or a third traffic shaper 22, 122, 202 configured to limit the bandwidth allocated to the second communication path 71, 171, 241 to a third adjustable bandwidth limiting value, wherein the at least one control unit 30, 130, 220, 30.1 is configured to control the multipath scheduler 26, 126, 203, the first traffic shaper 24, 124, 204, and the second traffic shaper 21, 121, 201 and/or third traffic shaper 22, 122, 202.

Preferably, the multipath capable communication device may further comprise a communication interface 14, 114, 181 configured to receive the first path metric, the first bandwidth limiting value and the second and/or third bandwidth limiting value, for example, from a traffic policy management system 60, and a memory 40, 140, 230, 40.1 configured to store the first path metric, the first bandwidth limiting value and the second and/or third bandwidth limiting value.

Preferably, the control unit 220 as shown in FIG. 3 may be configured to process data traffic to be transmitted for example via a hybrid access network
i) by controlling and/or executing
first the first traffic shaper 204,
second the multipath scheduler 203, and
third the second and/or third traffic shaper 201, 202, and
ii) by causing or controlling the communication device 100 to provide the data traffic on the first communication path 240 and/or the second communication path 241 for transmission.

Preferably, the control unit 30 as shown in FIG. 1 may be configured to process data traffic to be transmitted
i) by controlling and/or executing
first the multipath scheduler 26,
second an access multiplexer 25
third the first traffic shaper 24,
fourth an access de-multiplexer 23, and
fifth the second and/or the third traffic shaper 21, 22, and
ii) by causing or controlling the communication device 10 to provide the data traffic on the first and/or second communication path 70, 71 for transmission.

Preferably, the control unit 130 as shown in FIG. 2 may be configured to process data traffic to be transmitted
i) by controlling and/or executing
first the multipath scheduler 126,
second the second and/or third traffic shaper 121, 122
third an access multiplexer 125,
fourth the first traffic shaper 124, and
fifth an access de-multiplexer 123, and ii) by causing or controlling the communication device 110 to provide the data traffic onto the first and/or second communication path 170, 171 for transmission.

Preferably, the multipath capable communication device 10.1 as shown in FIG. 4 may further comprise a switching device 250 configured to deliver in dependence of a second path metric data traffic via a first bypass communication path 271 to the first communication path 70 or via a second bypass communication path 272 to the second communication path 71 or to the multipath scheduler 26.

Preferably, the multipath capable communication device 10.1 may further comprise a fourth traffic shaper 260 associated with the first bypass communication path 271 and configured to limit data traffic transmitted over the first bypass communication path 271 to a fourth adjustable bandwidth limiting value, and a fifth traffic shaper 261 associated with the second bypass communication path 272 and configured to limit data traffic transmitted over the second bypass communication path 272 to a fifth adjustable bandwidth limiting value.

Preferably, the multipath capable communication device 10.1 may be configured to readjust
the bandwidth limiting values of the fourth traffic shaper 260 and the second traffic shaper 21, and/or
the bandwidth limiting values of the fifth traffic shaper 261 and the third traffic shaper 22, and/or
the bandwidth limiting value of the first traffic shaper 24.

Preferably the multipath capable communication device may be implemented as a user end device, a residential router 10, 10.1, 110, or a network device 100.

Preferably, the multipath capable communication device 10, 10.1, 110 may comprise a first access network interface 11, 111 associated with the first communication path 70, 170 and a second access network interface 12, 112 associated with the second communication path 71, 171.

Preferably, the first access network interface 11, 111 may be a cellular access network interface, and the second access network interface 12, 112 may be a Wi-Fi or a fixed access network interface.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath capable communication device, comprising:
   a first communication path having a first physical access interface and a second communication path having a second physical access interface, wherein the first and second communication paths are configured to carry data traffic to be transmitted;
   at least one control unit;
   a multipath scheduler configured to distribute, based on a first path metric, data traffic among the first communication path and the second communication path;
   an access multiplexer;
   a first traffic shaper; and
   an access de-multiplexer;
   wherein the access multiplexer is configured to deliver multiplexed data traffic to the first traffic shaper; and
   wherein the first traffic shaper is configured to deliver data traffic to the access de-multiplexer and to limit the total bandwidth allocated to the multipath capable communication device to a first adjustable bandwidth limiting value;
   wherein the multipath capable communication device further comprises:
     a second traffic shaper configured to limit the bandwidth allocated to the first communication path to a second adjustable bandwidth limiting value; and/or
     a third traffic shaper configured to limit the bandwidth allocated to the second communication path to a third adjustable bandwidth limiting value;
   wherein the at least one control unit is configured to control the multipath scheduler, the first traffic shaper, and the second traffic shaper and/or third traffic shaper.

2. The multipath capable communication device of claim 1, further comprising:
   a communication interface configured to receive the first path metric, the first bandwidth limiting value, and the second bandwidth limiting value and/or the third bandwidth limiting value from a traffic policy management system; and
   a memory configured to store the first path metric, the first bandwidth limiting value, and the second bandwidth limiting value and/or the third bandwidth limiting value.

3. The multipath capable communication device of claim 1, wherein the at least one control unit is configured to process data traffic to be transmitted by:
   controlling the first traffic shaper, the multipath scheduler, and the second traffic shaper and/or the third traffic shaper; and
   causing the multipath capable communication device to provide the data traffic on the first communication path and/or on the second communication path for transmission.

4. The multipath capable communication device of claim 1, wherein the at least one control unit is configured to process data traffic to be transmitted by:
   controlling the multipath scheduler, the access multiplexer, the first traffic shaper, the access de-multiplexer, and the second traffic shaper and/or the third traffic shaper; and causing the multipath capable communication device to provide the data traffic on the first communication path and/or on the second communication path for transmission.

5. The multipath capable communication device of claim 1, wherein the at least one control unit is configured to process data traffic to be transmitted by:
controlling the multipath scheduler, the second traffic shaper and/or third traffic shaper, the access multiplexer, the first traffic shaper, and the access de-multiplexer; and
causing the multipath capable communication device to provide the data traffic on the first communication path and/or on the second communication path for transmission.

6. The multipath capable communication device of claim 1, further comprising
a switching device configured to deliver, based on a second path metric, data traffic via a first bypass communication path to the first communication path or via a second bypass communication path to the second communication path or to the multipath scheduler.

7. The multipath capable communication device of claim 6, further comprising:
a fourth traffic shaper associated with the first bypass communication path and configured to limit data traffic transmitted over the first bypass communication path to a fourth adjustable bandwidth limiting value; and
a fifth traffic shaper associated with the second bypass communication path and configured to limit data traffic transmitted over the second bypass communication path to a fifth adjustable bandwidth limiting value.

8. The multipath capable communication device of claim 7, wherein the multipath capable communication device is configured to readjust:
the bandwidth limiting values of the fourth traffic shaper and the second traffic shaper;
the bandwidth limiting values of the fifth traffic shaper and the third traffic shaper; and/or
the bandwidth limiting value of the first traffic shaper.

9. The multipath capable communication device of claim 1, wherein the multipath capable communication device is implemented as a user end device, a residential router, or a network device.

10. The multipath capable communication device of claim 1, wherein the first physical access interface is a cellular access network interface, and the second physical access interface is a Wi-Fi access network interface or a fixed access network interface.

11. The multipath capable communication device of claim 1, wherein the access multiplexer is connected to both the first communication path and the second communication path and is configured to multiplex the data traffic transmitted over the first communication path and the second communication path; and
wherein the access de-multiplexer is configured to forward respective portions of the data traffic from the first traffic shaper to the second traffic shaper and the third traffic shaper.

12. The multipath capable communication device of claim 11, wherein the second traffic shaper is connected to an LTE-based access interface, and the third traffic shaper is connected to an xDSL-based access interface.

\* \* \* \* \*